United States Patent [19]

McShirley

[11] 3,921,044

[45] Nov. 18, 1975

[54] ELECTRICAL DENTAL MALLET

[76] Inventor: Robert C. McShirley, 6535 San Fernando Road, Glendale, Calif. 91201

[22] Filed: Jan. 2, 1974

[21] Appl. No.: 429,542

Related U.S. Application Data

[62] Division of Ser. No. 244,487, April 17, 1972.

[52] U.S. Cl. ..................... 318/114; 318/126; 32/53

[51] Int. Cl.[2] ......................................... H02K 33/00

[58] Field of Search ........... 318/126, 129, 130, 132, 318/133, 114; 32/53, DIG. 3, DIG. 4, DIG. 6, DIG. 8

[56] References Cited

UNITED STATES PATENTS

| | | | |
|---|---|---|---|
| 1,040,424 | 10/1912 | Salt | 32/53 |
| 2,588,006 | 3/1952 | Hufnagel | 32/53 |
| 3,648,136 | 3/1972 | Krajewski et al. | 318/132 X |

*Primary Examiner*—R. N. Envall, Jr.
*Attorney, Agent, or Firm*—Blakely, Sokoloff, Taylor & Zafman

[57] ABSTRACT

An electrically driven dental mallet particularly suitable for condensing gold foil or amalgam restorations is disclosed. The device which utilizes solid state circuitry is actuated by the application of pressure to the condenser point; the condenser point may be stopped by digital pressure on buttons provided on the hand piece thus allowing the condenser point to be used for both hand and mechanical condensing.

5 Claims, 7 Drawing Figures

ELECTRICAL DENTAL MALLET

This is a division of application Ser. No. 244,487, filed Apr. 17, 1972.

BACKGROUND OF THE INVENTION

1. Field of the Invention

The invention relates to the field of dental mallets.

2 Prior Art

Power operated dental mallets, such as those utilized by dentists for condensing gold or amalgam are presently commercially available. These mallets are generally activated by pressure on the condenser point. Therefore, it is necessary to also employ hand instruments that are stable in order to remove the gold from a pick and press it into the cavity. With the presently developed and described electrical mallet the dentist is able to stop the mallet from operating and simultaneously lock the condenser point in a fixed position so that it may be used for hand condensing. Thus, the presently disclosed mallet eliminates the need for an instrument and more importantly eliminates the distraction caused by charging instruments.

The applicant believes that the closest prior art is a product manufactured by McShirley Products, Inc., of Glendale, Calif.; the electrical circuitry of which is covered by U.S. Pat. No. 2,581,806.

SUMMARY OF THE INVENTION

An electrically driven dental mallet, particularly suitable for condensing gold foil or amalgams is described. The device includes a control unit constructed of solid state circuitry, and which utilized a silicon-controlled rectifier (SCR) for driving a solenoid included in the hand piece of the device. The hand piece of the electrical mallet is included within an elongated, cylindrically shaped housing; the condenser point is disposed at one end of the housing and a cable which couples the control unit with the hand piece is disposed from the other end. A switch disposed within the housing, which is closed by applying pressure to the condenser point, causes the control unit to drive the solenoid at frequencies and amplitudes which may be varied by the control unit. Locking means which comprise a plurality of buttons that project from the hand piece enables the condenser point to be manually locked in place, so that the point may be used for hand condensing.

DETAILED DESCRIPTION OF THE INVENTION

Figure 1:
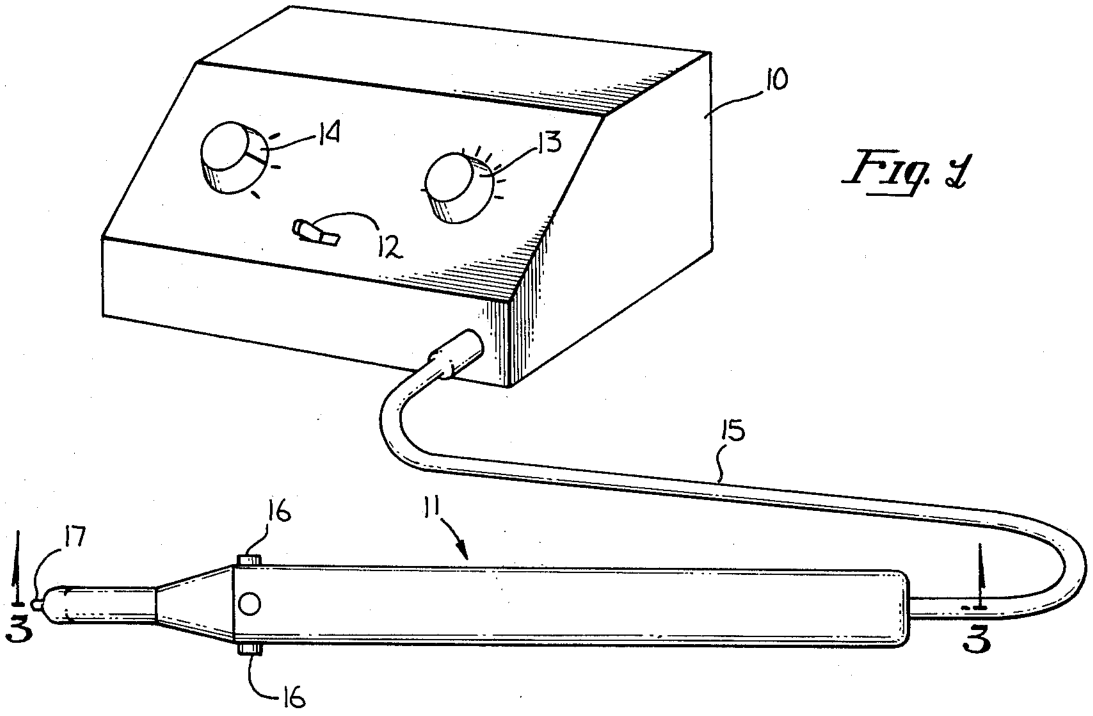
FIG. 1 illustrates the overall dental mallet device which includes a control unit, a hand piece and an interconnecting cable.
Figure 2:
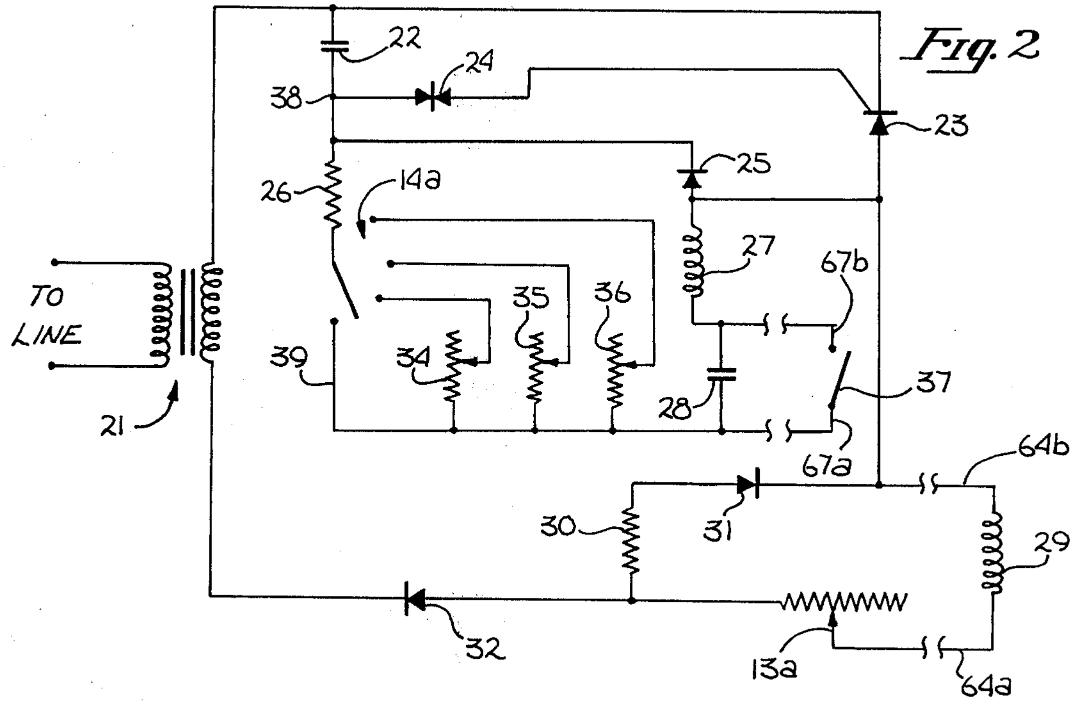
FIG. 2 is an electrical schematic illustrating the presently preferred solid state circuitry utilized to drive the solenoid included within the hand piece.

Referring to FIG. 1, the entire dental mallet device is illustrated, which includes the control unit 10, a hand piece 11, and a cable 15 which interconnects the control unit 10 with the hand piece 11. An on-off switch 12 is utilized to apply power to the control unit, and, in particular, to couple the transformer 21 of FIG. 2 to a source of power, which, in the presently preferred embodiment, is standard alternating current. An intensity know 13 which is illustrated as rheostat 13*a* in FIG. 2 is utilized to control the amplitude of the reciprocating motion of the condenser point 17. The control knob 14 which has four possible settings in the presently preferred embodiment is utilized to select the frequency at which the condenser point 17 will reciprocate; this knob is cooperatively coupled to the switch 14*a* illustrated in FIG. 2.

Referring to FIG. 2, the primary winding of transformer 21 is coupled to the source of alternating current through switch 12 of FIG. 1, while one terminal of the secondary winding is coupled to capacitor 22 and one terminal of the SCR 23. The other terminal of the secondary winding of transformer 21 is coupled to one terminal of diode 32. The other lead of capacitor 22 is coupled to junction 38; this junction is also coupled to resistor 26, one terminal of diode 25, and to the control lead of SCR 23 through triac 24. Resistor 26 may be selectively coupled through switch 14*a* to either junction 39 or to the wiper leads of potentiometers 34, 35 or 36. Junction 39 is also coupled by lead 67*a* to a switch 37 located within the hand piece; this lead being part of the cable 15 illustrated in FIG. 1. The other lead to switch 37, lead 67*b*, is coupled through choke 27 to the other terminals of diode 25 and SCR 23. A capacitor 28 is disposed across leads 67*a* and 67*b*. The other terminal of diode 32 is coupled to the solenoid coil 29 located within the hand piece 11 through rheostat 13*a* and lead 64*a*. The other terminal of coil 29 is coupled through 64*b* to the other terminal of SCR 23 and also to one terminal of diode 31. Leads 64*a* and 64*b* are also part of cable 15 of FIG. 1. The other terminal of diode 31 is coupled through resistor 30 to the common junction formed between rheostat 13*a* and the other terminal of diode 32.

The electrical components shown in FIG. 2 may be ordinary components, all of which are commercially available. In the presently preferred embodiment transformer 21 produces a secondary voltage of approximately 150 volts. SCR 23 may be a commercially available silicon controlled rectifier or equivalent means for controlling a current which includes at least one control lead. In the operation of the circuit of FIG. 2 the voltage at junction 38 primarily determines when the SCR 23 will conduct, hence when power will be applied through coil 29. The time constant of an RC network primarily comprising capacitor 22, resistor 26 and the resistance, if any, selected by switch 14*a* determines the frequency at which the SCR 23 conducts. Diode 25 synchronizes the charging of this RC network, so that the rate at which the mallet reciprocates is synchronized to the alternating current applied to transformer 21. The combination of capacitor 28 and inductor 27 is utilized to reduce the arcing associated with switch 37, this technique being commonly utilized in the art. The combination of resistor 30 and diode 31 are utilized to reduce the effects of the back emf associated with coil 29 on the remainder of the circuit.

In operation the current through coil 29, in conjunction with the springs coupled to the plunger of the solenoid, drive the plunger, and hence the condenser point, in reciprocating motion. by selecting one of the four switch positions of switch 14, in the presently preferred embodiment, the frequency of the point movement may be controlled to either 3,600, 1,800, 1,200, or 400 cycles per minute. The amplitude of the strokes is adjustable by rheostat 13*a*. Potentiometers 34, 35 and 36 are utilized to initially adjust the amplitude at its peak for each of the four present frequencies, thus the potentiometers may also be utilized to adjust the amplitude of the signal applied to coil 29.

Referring to FIGS. 3 through 6 the hand piece 11 is enclosed within an elongated cylindrical main housing 42, which connects at one end to the generally cylindrically shaped end cap 43 and at the other end to front housing 59. The coil 29 is disposed within housing 42, and is utilized to drive plunger 55. The plunger 55 is rigidly coupled at one end to main shaft 60, so that the shaft and plunger move together, and at its other end to rear shaft 61, also so that the plunger and shaft 61 move totether. A magnetic return path 56, which comprises a laminate magnetic material is rigidly disposed within the front end of the coil 29 and includes an axially disposed aperture such that shaft 60 may freely pass 56, this member.

The end cap 43 includes an axially disposed aperture at one end which allows the cable 15 to pass freely through and at the other end includes threads for cooperatively engaging one end of nipple 44. The other end of nipple 44, in addition to securing the cap 43 to the housing 42, provides an annular shoulder against which rests washer 49. The end retainer 47, which is a generally symmetrically shaped member includes a flange 48, the outer portion of which rests against rubber washer 50. Steel washer 49 is disposed between washer 40 and the shoulder of nipple 44. The retainer 47 also includes an axially disposed threaded bore for cooperatively engaging a resilient bumper 45 and a notch cut into flange 48 to allow lead 64*a*, 64*b*, 67*a* and 67 *b* to pass between the retainer and the housing. Also partially disposed within end retainer 47 is a spring 57 and a nut 62, which couples the axially disposed spring 57 to one end of the rear shaft 61. The other end of the rear shaft 61 is rigidly coupled to plunger 55 through bearing 53. A bobbin 52 which forms one end of the coil 29 is disposed between bobbin 52 and flange 48, the plastic ring includes a notch to allow the free passage of leads 64*a*, 64*b*, 67*a* and 67*b*.

The clearance 63 illustrated between magnetic return member 56 and plunger 55 defines the distance or travel of the plunger. This travel may be increased or decreased by adjusting bumper 45. Spring 57, which is under tension within the housing, urges the plunger 55 rearward (towards bumper 45) such that the nut 62 abuts the bumper 45.

Figures 3, 4, 5, 6, 7:
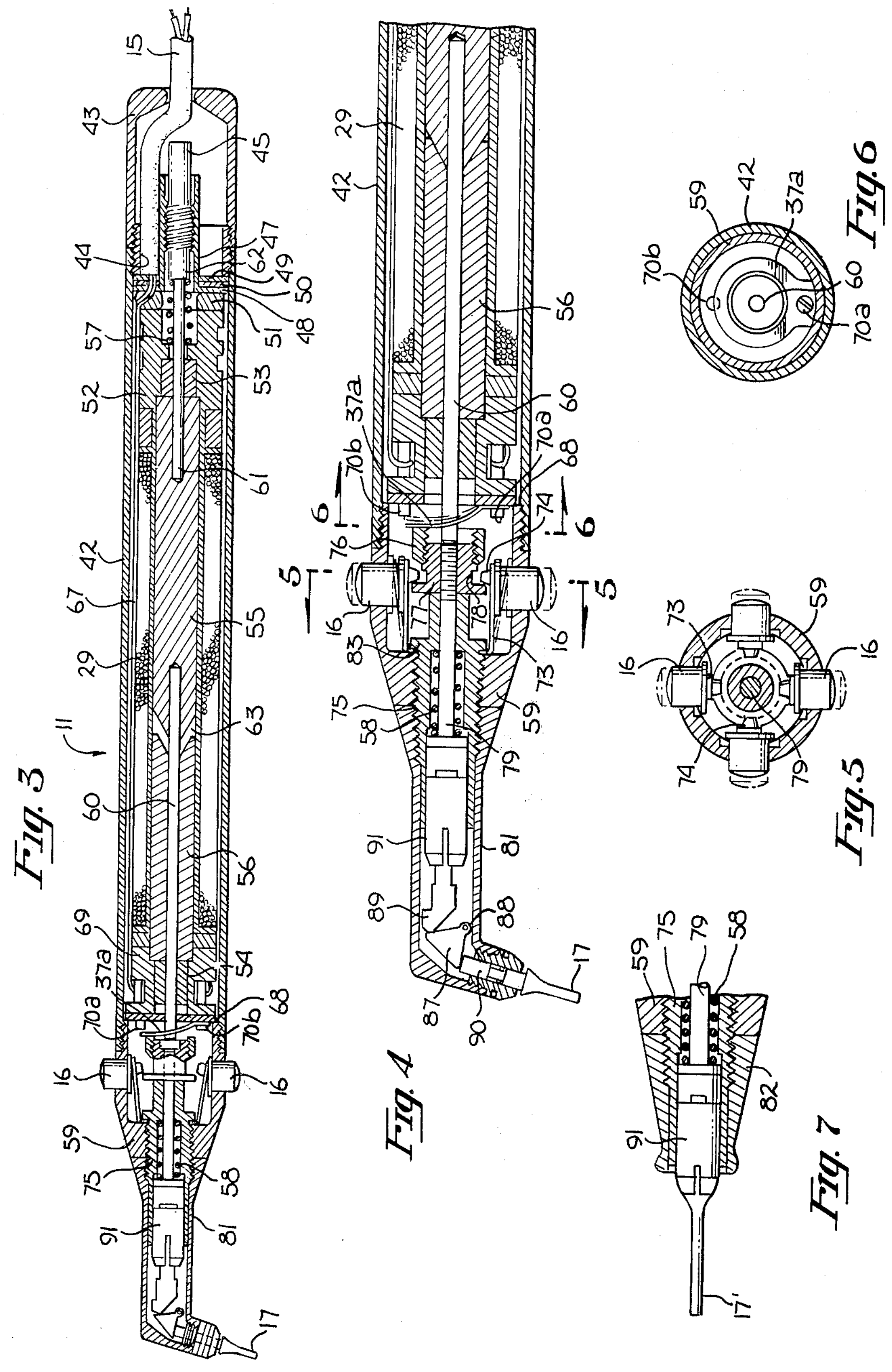
FIG. 3 is a cross-sectional view of the hand piece taken through section lines 3—3 of FIG. 1.
FIG. 4 is an enlarged view of the front end of the hand piece shown in FIG. 3.
FIG. 5. is a cross-sectional view of the hand piece taken through section lines 5—5 of FIG. 4.
FIG. 6 is a cross-sectional view of the hand piece taken through section line 6—6 of FIG. 4.
FIG. 7 is an enlarged view of an alternate condenser point which is axially disposed within the hand piece.

The front end of solenoid coil 29 includes a bobbin 69 which has switch arm 37*a* (FIG. 6) rigidly coupled to its circular end. This switching arm is a part of the switch 37 illustrated in FIG. 2, with contact 70*a* being coupled to lead 67*a* and contact 70*b* being coupled to lead 67*a* and contact 70*b* being coupled to lead 67*b* of FIG. 2. The switch arm 37*a* is a generally annular shaped member normally biased as illustrated in FIG. 3 such that it does not engage contact 70*b*. A bearing 54 is disposed within the bobbin 69, thus allowing the main shaft 60 to move freely within the bobbin, without interfering with switching arm 37*a*.

The cylindrically shaped front housing 59 includes threads which cooperatively engage threads disposed within the interior of housing 42. Front housing 59 also defines an annular shaped shoulder 68 against which bobbin 69 abuts. A generally cylindrically shaped retainer 75 threadingly engages the tapered end of housing 59 and also provides threads for coupling the tip housing 81 to the front housing 59. A front shaft 79 which terminates at one end in member 77 is rigidly coupled at its other end through chuck 91 for contacting drive plate 89. A spring 58 is axially disposed about shaft 79 within front retainer 75 and urges the shaft forward, that is, towards rocker 87. The generally cylindrically shaped member 77 includes a concentrically disposed groove 78 for cooperatively engaging the detents 74. Member 77 which is rigidly coupled to shaft 79 includes an axially disposed switch bumper 76, comprising a non-conductive material, which is utilized for depressing switch arm 37*a*, such that electrical contact may be made between contacts 70*a* and 70*b*.

A claw 74 includes an annular end which is rigidly coupled to housing 59 by the flanged portion 83 of front retainer 75. Four arms extend rearwardly from this annularly shaped section of the claw and are positioned at intervals of approximately 90° about member 77. One surface of each of the arms is coupled to a stop button 16 where the opposite surface of each of the arms is coupled to a detent 74. The arms normally urge the button 16 outwardly from member 77 so that the detent 74 do not engage groove 78.

Housing 81 which has the general shape of an elbow is coupled to the housing 59 since it threadingly engages front retaianer 75. The condenser point 17 is disposed within chuck 90 in the end of housing 81. The rocker 87 which is pivotally coupled at point 88 is utilized to transfer the reciprocating motion of plate 89 to the chuck 90 and condenser point 17.

The hand piece may be fabricated from ordinary metal parts, except for those parts which should not be made of non-conductive material such as the switch bumper 76. The switch bumper 76, in addition to other parts, may be made of plastic, for example in the presently preferred embodiment ring 51 is a plastic member. In the presently preferred embodiment the housing of the hand piece is fabricated from stainless steel or aluminum. In assembling the hand piece, the coil 29 including the bobbins, bearings, add switch arms 37*a* are inserted into housing 42 with the nipple 44 and the end cap 43 removed. The bobbin 69 is abutted against the shoulder 68 of housing 59. Next, the ring 51 is set in place followed by the end retainer 47 and the rubber and steel washers. The nipple 44 is then threaded into housing 42 against the steel washer. The nipple is tightened sufficiently to secure the assembly which includes the bobbins and coil in place within the housing 42. The steel washer 49 permits the nipple to be tightened against the rubber washer without causing the coil to rotate in the housing. It would be readily apparent to one of ordinary skill in the art that the remainder of the hand piece may be readily assembled without any special techniques once the various parts are fabricated.

In FIG. 7 an alternate condenser point 17 is shown coupled to chuck 91. The chuck 91 is disposed within a cylindrical housing 82 which is axially disposed on the hand at retainer 75. This angled housing of FIGS. 3 and 4 is used to reach areas which are not readily accessible with the straight housing of FIG. 7.

In the operation of the unit, assuming that power has been applied to transformer 21 of FIG. 2, the mallet is actuated by the application of pressure to the condenser point 17 or 17'. This is typically done by inserting the point against the filling material, such as gold foil or amalgam and pressing against the material. When this occurs shaft 74 through rocker 87 and plate 89 moves rearwardly causing bumper 76 to contact arm 70, closing switch 37 to FIG. 2. When switch 37 is closed power is applied to the coil 29, thereby driving shaft 60 in a reciprocating motion, since the plunger 55 first moves forward closing clearance 63, then rearward against the bumper 45. As shaft 60 moves, it in turn moves shaft 79, thereby driving point 17 in reciprocating motion. It should be noted that the travel of the shaft 60 is not sufficient to cause bumper 76 to break the contact between arm 37*a* and contact 70*b*. When pressure is removed from point 17, spring 58 causes shaft 79 to move forward, thereby breaking the contact of switch 37.

While using the mallet if it becomes necessary to interrupt the movement of the mallet for any one of a number of reasons, the dentist may press against any of the buttons 16. When the buttons 16, or any of them, are depressed, the detents 74 engage groove 78 to locking shaft 79, and condenser point 17 in a fixed position. It should be noted that when point 17 is locked in place, the switch 37 of FIG. 2 is open. With the buttons 16 depressed the point 17 may be used for hand condensing, thereby making it unnecessary for the dentist to remove the hand piece from his hand and to pick up another dental instrument.

In utilizing gold foil, the cantles of foil are first annealed by placing them on a hot plate or by passing them individually through a clean flame. In either case the gold is carried to the cavity on a pick and transferred by pushing it from the pick with a stable hand instrument which may also be used to press the gold into place prior to malleting. With the presently disclosed device, the condenser tip, when digital pressure is applied to the stop buttons, may be used to remove the foil from the carrier instrument or pick and to seat it in the tooth. The point may then be used for both hand and mechanical condensing as desired by releasing the stop buttons 16.

Also, for amalgams the use of both hand and mechanical condensing with the condenser point 17 or 17' permits the condensing of a low mercury amalgam without bringing excessive mercury to the surface of the filling.

Thus, a dental mallet has been disclosed which includes solid state circuitry for electrically driving the device and which also includes a feature whereby the condenser point may be locked in a fixed position and utilized for hand condensing.

I claim:

1. In an electrically driven dental mallet, a control unit for generating electrical signals for driving such mallet in reciprocating motion comprising:

a controlled rectifier coupled to such mallet, said controlled rectifier including a control terminal;

a capacitor coupled to said control terminal of said controlled rectifier;

a plurality of adjustable resistance means;

a switch having a plurality of positions for selecting a different one of said adjustable resistance means for coupling to said capacitor for each of said positions, said switch being coupled to said capacitor and said resistance means; and, amplitude control means for controlling the amplitude of said electrical signals coupled to such mallet and said controller rectifier;

whereby the frequencies of said signals for each switch position, may be separately adjusted by said adjustable resistance means such that a plurality of predetermined frequencies may be preset.

2. The control unit for a dental mallet defined by claim 1 wherein said plurality of adjustable resistance means each comprise a potentiometer.

3. The control unit for a dental mallet defined by claim 2 wherein said amplitude control means comprises a potentiometer.

4. The control unit for a dental mallet defined by claim 1 wherein said control rectifier comprises a silicon control rectifier.

5. The control unit for a dental mallet defined by claim 4 wherein said silicon control rectifier and amplitude control means are coupled to a transformer.

* * * * *